United States Patent
Goldstein et al.

(10) Patent No.: US 9,069,083 B2
(45) Date of Patent: Jun. 30, 2015

(54) PORTABLE RADIATION DETECTOR

(75) Inventors: Michael D. Goldstein, Herzliya (IL); Jacob Alter, Ramat Gan (IL); Menachem Margaliot, Bnei Brak (IL)

(73) Assignee: DANIMAR LTD., Tel Aviv (IL)

(*) Notice: Subject to any disclaimer, the term of this patent is extended or adjusted under 35 U.S.C. 154(b) by 555 days.

(21) Appl. No.: 13/473,610

(22) Filed: May 17, 2012

(65) Prior Publication Data

US 2012/0292518 A1 Nov. 22, 2012

Related U.S. Application Data

(60) Provisional application No. 61/487,738, filed on May 19, 2011.

(51) Int. Cl.
*G01T 1/20* (2006.01)

(52) U.S. Cl.
CPC .............................. *G01T 1/20* (2013.01)

(58) Field of Classification Search
CPC ............................................... G01T 1/20
USPC .............................. 250/370.09, 370.11
See application file for complete search history.

(56) References Cited

U.S. PATENT DOCUMENTS

| | | | | |
|---|---|---|---|---|
| 5,006,713 A | * | 4/1991 | Miller et al. | 250/361 R |
| 6,359,282 B1 | * | 3/2002 | Sekela | 250/370.11 |
| 6,362,480 B1 | * | 3/2002 | Peter et al. | 250/366 |
| 6,404,851 B1 | * | 6/2002 | Possin et al. | 378/98.7 |
| 7,889,498 B2 | * | 2/2011 | Diebel et al. | 361/679.56 |
| 8,735,842 B2 | * | 5/2014 | Tsai et al. | 250/370.11 |
| 2004/0149918 A1 | * | 8/2004 | Craig et al. | 250/370.01 |
| 2005/0148094 A1 | * | 7/2005 | Tyrrell et al. | 436/172 |
| 2008/0173820 A1 | * | 7/2008 | Tseng et al. | 250/369 |
| 2009/0012745 A1 | * | 1/2009 | Longman et al. | 702/179 |
| 2010/0226580 A1 | * | 9/2010 | Frank | 382/209 |
| 2010/0243908 A1 | * | 9/2010 | Shoji et al. | 250/370.11 |
| 2011/0133093 A1 | * | 6/2011 | Jagannathan et al. | 250/366 |
| 2011/0188633 A1 | * | 8/2011 | Ohta et al. | 378/102 |
| 2012/0273688 A1 | * | 11/2012 | Tsai et al. | 250/370.07 |
| 2012/0329517 A1 | * | 12/2012 | Elin | 455/556.1 |
| 2013/0292576 A1 | * | 11/2013 | Tsai et al. | 250/370.07 |
| 2013/0320220 A1 | * | 12/2013 | Donowsky | 250/366 |

OTHER PUBLICATIONS

Saint-Gobain Ceramics & Plastics, "Scintillation Optical Fibers", Jun. 21, 2011.
Creative Electron, "iRad Geiger for Apple iOS Devices and iRad Geiger for Android Devices", USA, 2012.

* cited by examiner

*Primary Examiner* — Casey Bryant
(74) *Attorney, Agent, or Firm* — D. Kliger I.P. Services LTD.

(57) ABSTRACT

Apparatus for detecting ionizing radiation includes a mobile telephone, including an imaging assembly, which includes a solid-state image sensor. A radiation converter is mounted in proximity to the image sensor and is configured to emit, in response to the ionizing radiation, lower-energy radiation for detection by the image sensor. A processor, contained in the mobile telephone, is configured to process images captured by the image sensor so as to assess an intensity of the ionizing radiation.

25 Claims, 6 Drawing Sheets

PORTABLE RADIATION DETECTOR

CROSS-REFERENCE TO RELATED APPLICATIONS

This application claims the benefit of U.S. Provisional Patent Application 61/487,738, filed May 19, 2011, which is incorporated herein by reference.

FIELD OF THE INVENTION

The present invention relates generally to radiation measurement, and particularly to portable radiation detection devices.

BACKGROUND

Various types of devices and methods are known in the art for measuring the intensity of ionizing radiation. One important application of such devices and methods is in evaluating levels of radiation to which people may be exposed and warning against excessive exposure to radiation. Geiger counters and film badges, for example, have been widely used for such purposes for many years.

Portability can be an important consideration in the design of a radiation detector. For example, U.S. Patent Application Publication 2008/0173820, whose disclosure is incorporated herein by reference, describes a portable radiation detection apparatus, which transforms detected radioactivity into an analog pulse signal and then converts the analog pulse signal into a digital pulse signal, which is counted. The apparatus is said to provide low cost and wireless communication, as well as distance protection for radiation protection personnel.

WikiSensor Dosimeter is a an application for smart phones for measuring radioactivity. According to information provided at wikisensor.com, the cameras lenses found on most smart phones are sensitive not only to visible light, but also to other types of waves including gamma and X-rays emitted by radioactive sources. When the camera is covered with something opaque (such as electrical tape or the thumb of the user), the lens no longer captures visible light, but only gamma and X-rays. The application algorithm counts the number of impacts received and translates it into a value in microsieverts per hour.

As another example, the iRad® Geiger, offered by Creative Electron, Inc. (Carlsbad, Calif.), is said to transform an iPhone, iPad, iPod, or Android device into a radiation detector instrument. The battery-free iRad Geiger has an interface to the audio jack to harvest energy from the smart phone. An application allows users to measure, log, alarm, and map their radiation measurements.

The information presented above is intended to give a general overview of the present state of the art in the field of the invention, and should not be considered an admission that the publication and products cited here may be considered in any way to be prior art against the invention described in this patent application.

SUMMARY

Embodiments of the present invention that are described hereinbelow provide improved methods and systems for detection of ionizing radiation.

There is therefore provided, in accordance with an embodiment of the present invention, apparatus for detecting ionizing radiation, including a scintillator in a mount for attachment to a portable imaging device. Optics are configured to direct visible light emitted by the scintillator in response to the ionizing radiation onto an image sensor in the imaging device.

In a disclosed embodiment, the imaging device includes a mobile telephone.

In some embodiments, the mount includes a cover, which is configured to fit over the portable imaging device and in which the scintillator is embedded. The scintillator may include a fiber, having an end positioned so as to direct the light emitted within the fiber toward an aperture of the imaging device. Alternatively, the scintillator may include a slab of a scintillator material. The slab may be shaped and coated so as to direct the light emitted within the slab toward an aperture of the imaging device. In another embodiment, the cover is configured to fit over an aperture of the imaging device and may be movable between a radiation-sensing position, in which the scintillator blocks the aperture, and an image-sensing position, in which the aperture is unblocked.

In some embodiments, the apparatus comprises a processor contained in the imaging device, wherein the processor is configured to process signals emitted by the image sensor in order to assess an intensity of the ionizing radiation. Typically, the processor is configured to alert a user of the imaging device when the assessed intensity exceeds a predefined threshold. Additionally or alternatively, the processor is configured to evaluate a shape of an image captured by the image sensor in order to distinguish the light emitted by the scintillator from background light that is incident on the image sensor.

There is also provided, in accordance with an embodiment of the present invention, apparatus for detecting ionizing radiation, which includes a mobile telephone, including an imaging assembly, which includes a solid-state image sensor. A radiation converter is mounted in proximity to the image sensor and is configured to emit, in response to the ionizing radiation, lower-energy radiation for detection by the image sensor. A processor, contained in the mobile telephone, is configured to process images captured by the image sensor so as to assess an intensity of the ionizing radiation.

The radiation converter may include an electron emitter layer placed behind the solid-state image sensor in the imaging assembly, or a scintillator.

There is additionally provided, in accordance with an embodiment of the present invention, a method for detecting ionizing radiation, which includes coupling a radiation converter to a portable imaging device including an image sensor so as to direct lower-energy radiation onto the image sensor in response to the ionizing radiation. Signals emitted by the image sensor are processed in order to assess an intensity of the ionizing radiation.

The present invention will be more fully understood from the following detailed description of the embodiments thereof, taken together with the drawings in which:

DETAILED DESCRIPTION OF EMBODIMENTS

Nearly all cellular telephones and personal digital assistants (PDAs) now on the market are equipped with a solid-state image sensor. Embodiments of the present invention take advantage of this existing capability to enable users of such devices to measure ionizing radiation in their environment, and thus to be aware of and avoid possible threats to their health due to such radiation. Because these embodiments use existing detection and computing capabilities of devices that are already widely available, they offer a solution that is both cost-effective and easily accessible to users, without requiring users to exercise any particular technical skill.

In the disclosed embodiments, a radiation converter is added to an existing portable imaging device in order to enable the device to sensitively detect high-energy ionizing radiation, such as gamma rays. The term "portable imaging device," as used in the context of the present description and in the claims, refers to any sort of mobile device that contains an electronic image sensor, including, without limitation, cellular telephones, PDAs, tablet computers, and the like. The term "radiation converter" refers to a passive component that efficiently coverts the ionizing radiation to lower-energy radiation in an energy range that can be efficiently detected by conventional silicon image sensors, such as photons in the visible, near-infrared or near-ultraviolet range, or energetic electrons. A scintillator is one example of such a radiation converter.

Some embodiments of the present invention that are described hereinbelow provide radiation detection apparatus comprising a scintillator, which is mounted onto a portable imaging device. Typically, optics direct visible light emitted by the scintillator in response to ionizing radiation onto the image sensor in the imaging device. The scintillator, which may be attached externally or internally to the imaging device, converts gamma radiation into photons in the visible light range, which are then received by the existing image sensor in the imaging device.

Software running on the imaging device differentiates the signals created by these photons from noise and other background signals output by the image sensor. When the image signal due to the scintillator output passes a certain threshold, the imaging device outputs an indication to the user, typically in the form of a visible and/or audio signal, to warn the user of a suspected environmental hazard or an object emitting dangerous radiation.

Although most of the embodiments described hereinbelow relate to emission of visible light photons from the scintillator and detection of these photons by the image sensor, in alternative embodiments a scintillator or other radiation converter in proximity to the image sensor in a portable imaging device may emit other sorts of low-energy radiation that the image sensor is capable of detecting, such as infrared radiation, ultraviolet radiation or electrons.

Figure 1:
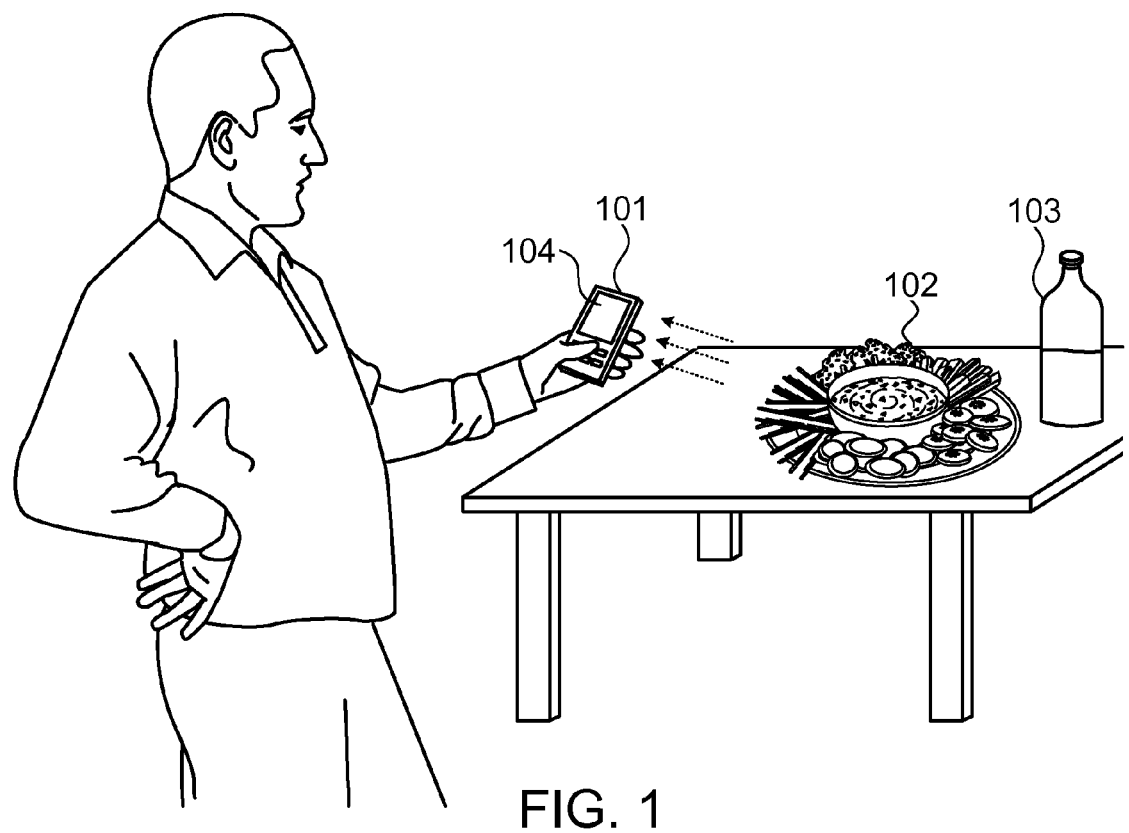
FIG. 1 is a schematic pictorial illustration showing the use of a radiation detection device, in accordance with an embodiment of the present invention.

FIG. 1 is a schematic pictorial illustration showing the use of a radiation detection device 101, in accordance with an embodiment of the present invention. Device 101 comprises a cellular telephone with the addition of a scintillator and software, as explained below. In this example, the user operates device 101 to detect radioactive emission from foodstuffs 102, 103 in a home or restaurant. Device 101 comprises a processor 106, which measures incident gamma radiation and outputs a reading on a display screen 104 of the device. Alternatively or additionally, device 101 may be used in other environments and applications. For example, the device may be set to take readings of radiation levels autonomously at certain intervals and to alert the user when the level passes a preset threshold. Further alternatively or additionally, the device may be set to multiply the momentary radiation level by the duration of the measured exposure, to report continuously the accumulated radiation dose received by the device, and to issue an alarm when a preset accumulated radiation dose is exceeded.

Figure 2:
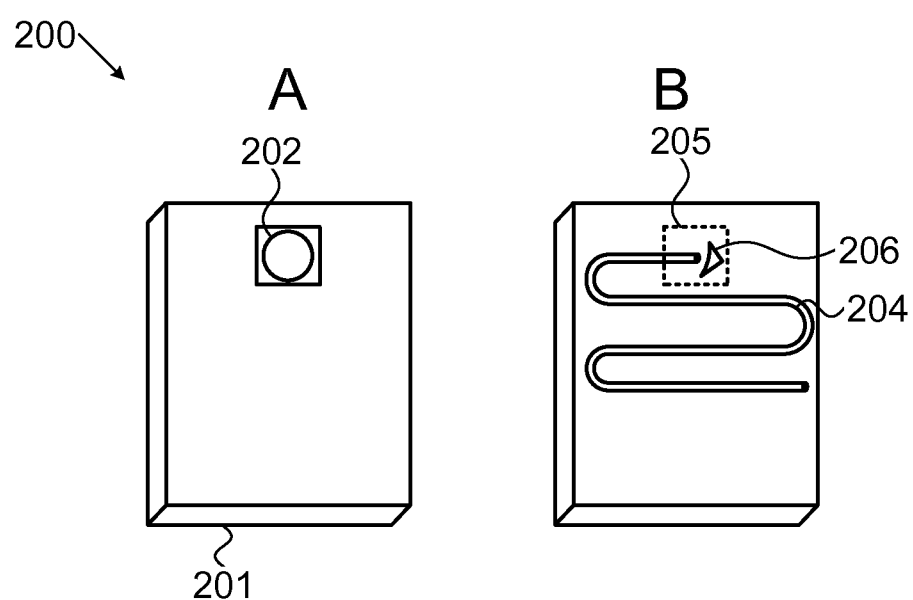
FIGS. 2A and 2B are schematic pictorial and cutaway illustrations, respectively, of a radiation sensing assembly for a portable imaging device, in accordance with an embodiment of the present invention.

FIGS. 2A and 2B schematically illustrate a radiation sensing assembly 200 for a portable imaging device, in accordance with an embodiment of the present invention. FIG. 2A is an external pictorial view of assembly 200, while FIG. 2B is a cutaway view showing internal details of the assembly. Assembly 200 in this example comprises an external cover 201, which is sized and shaped to fit over the back side of a particular type of smart phone, such as device 101, and gives the device the capability of detecting ionizing radiation, as explained below. Thus, sensing assemblies may be customized to fit over various types of portable imaging devices, like protective covers for smart phones that are known in the art. Cover 201 has an aperture 205, which fits over an objective lens 202 of the imaging device, permitting the lens to focus light onto the image sensor (not shown). The aperture may be covered to prevent entry of ambient light while radiation measurement is in progress or alternatively uncovered to permit the image sensor to capture images in the conventional manner.

A scintillator fiber 204 is embedded in cover 201. Fiber 204 may comprise, for example, BCF-20 polymer fiber, sold by Saint Gobain SA, wherein a collimating lens at one end of the fiber (not shown in this figure) is positioned in front of aperture 205. A mirror 206 at the end of fiber 204 direct photons from the fiber into aperture 205, and lens 202 may further focus the photons onto the image sensor.

Figure 3:
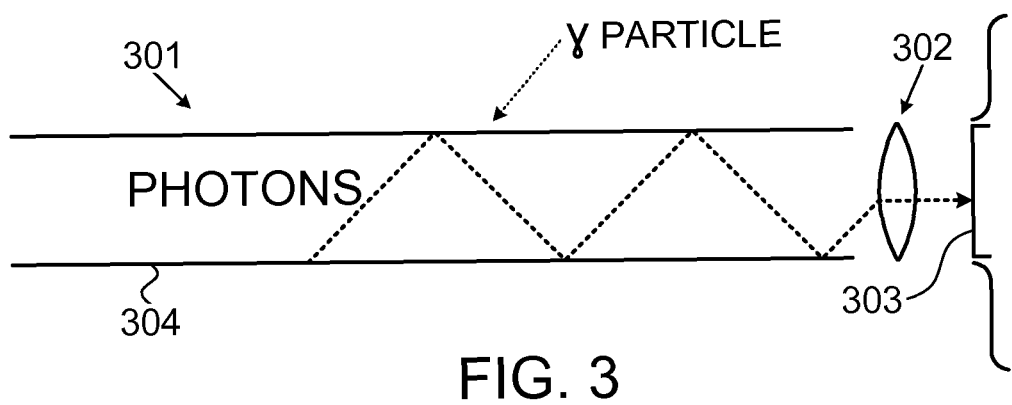
FIG. 3 is a schematic side view of a radiation sensing assembly, in accordance with an embodiment of the present invention.

FIG. 3 is a schematic side view of a radiation sensing assembly 301, in accordance with an embodiment of the present invention. The elements of assembly 301, shown here in detail, could be used in assembly 200, as described above. A polymer scintillator fiber 304 converts incident gamma rays into visible light. Each gamma particle typically generates a burst of several hundred thousand visible photons. Some of these photons travel along the fiber to a collimation lens 302 at the exit aperture, which focuses the light through an aperture 303 of the imaging device.

The photons exiting the fiber have a Gaussian statistical distribution about the central axis of fiber 304. The image sensor in the imaging device captures an image of this distribution, which is characterized by a Gaussian shape. Furthermore, individual gamma-induced light bursts have a short time duration (no more than a single image frame), although more intense gamma radiation will give a continuous stream of bursts. These properties differentiate the gamma ray image from artifacts due to background light reaching the image sensor and from thermal noise. Software running on the processor in the imaging device analyzes the images output by the image sensor and generates a gamma ray count when the spatial shape and possibly the temporal characteristics of an image match the appropriate criteria.

Figure 5:
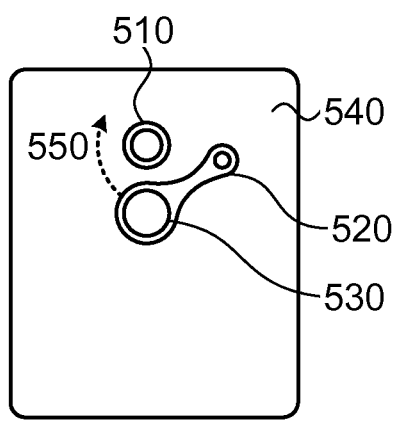
FIG. 5 is a schematic frontal view of a radiation sensing assembly, in accordance with another embodiment of the present invention.
Figure 6:
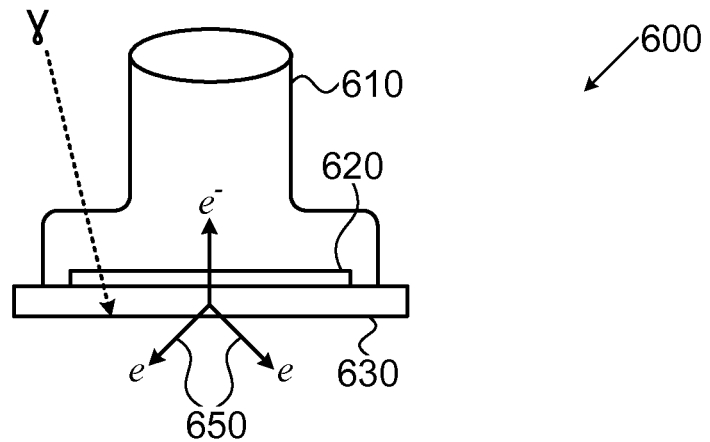
FIG. 6 is a schematic side view of a radiation sensing assembly, in accordance with an alternative embodiment of the present invention.
Figure 7:
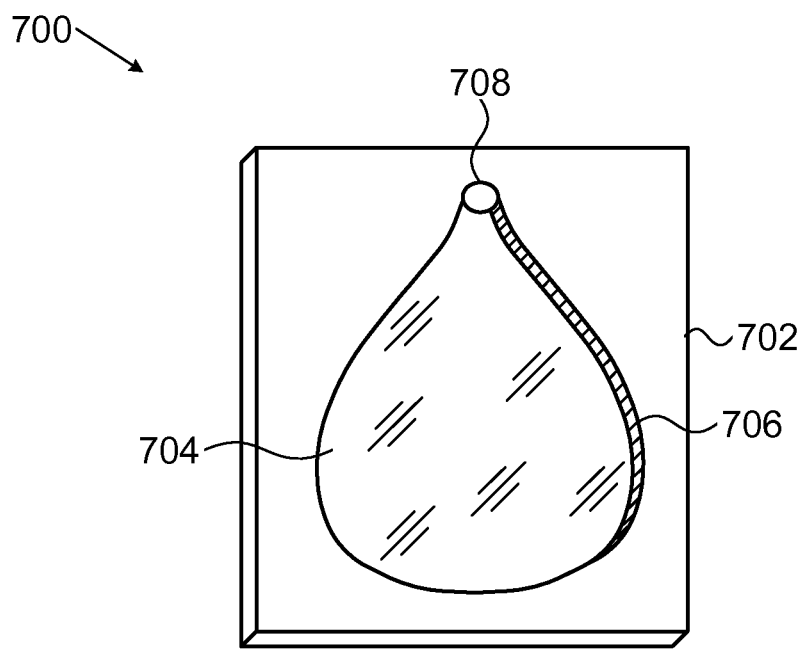
FIG. 7 is a schematic pictorial illustration of a radiation sensing assembly, in accordance with a further embodiment of the present invention.

In alternative embodiments, the scintillator that is mounted on a portable imaging device may be of a different form. For example, the back cover of a smart phone may comprise a sheet made of rare-earth scintillator material, such as NaI(Tl), with appropriate optics for collecting and directing light onto the image sensor; or the scintillator material may be embedded in or overlaid on the objective lens of the imaging device. Other alternative designs are shown in FIGS. 5-7.

Figure 4:
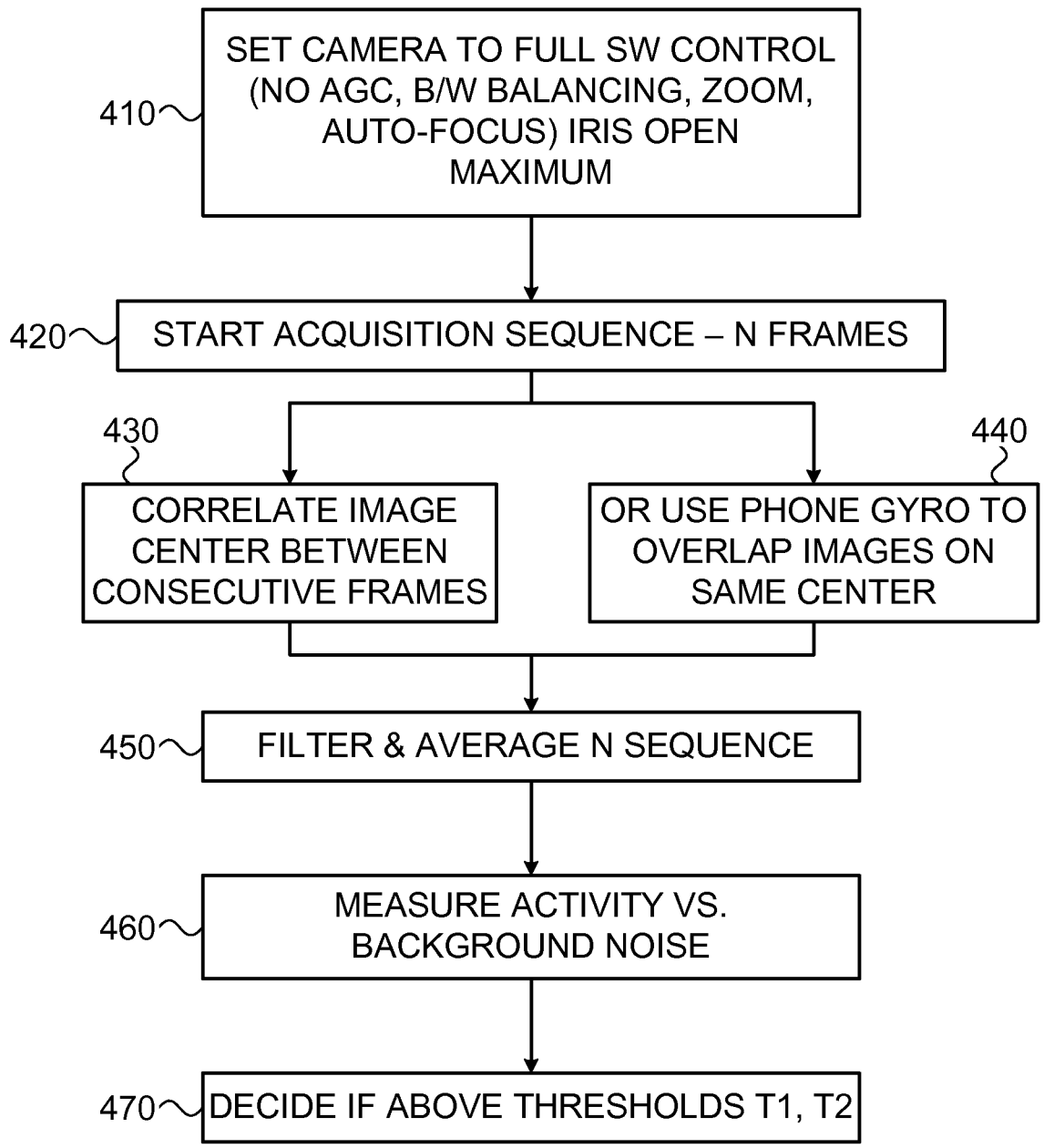
FIG. 4 is a flow chart that schematically illustrates a method for radiation sensing, in accordance with an embodiment of the present invention.

FIG. 4 is a flow chart that schematically illustrates a method for radiation sensing, in accordance with an embodiment of the present invention. This method is described, for the sake of convenience and clarity, with reference to imaging device 101 and assembly 200. The following description also assumes that imaging device 101 has a library of software functions that can be used to control the operating parameters of the image sensor and possibly ancillary components in the imaging device. Such libraries are available for may smart phones, such as the Apple® iPhone® 4. The principles of this method may similarly be applied, however, using other types of imaging devices, scintillator assemblies, and software.

The software for performing the functions that are described herein may be downloaded to imaging device 101 in electronic form, over a network, for example, possibly in the manner of smart phone applications that are known in the art. Additionally or alternatively, the software may be stored in tangible, non-transitory computer-readable media, such as electronic, magnetic, or optical memory media. Further additionally or alternatively, at least some of these processing functions may be performed by dedicated or programmable hardware logic circuits in the imaging device.

The method of FIG. 4 is typically initiated when the user of device 101 invokes a radiation measurement application, or when some other triggering event occurs. The software running on device 101 sets the image sensor parameters to a non-automatic mode, in which the parameters are controlled by the application software rather than by standard automatic control, at a mode setting step 410. In other words, camera functions such as automatic gain control (AGC), auto-focus, zoom and flash are turned off. The software typically sets the image sensor for maximum sensitivity, with the iris (if any) fully open and the electronic shutter set to the maximum exposure time.

The software instructs imaging device 101 to acquire a sequence of a predefined number of images, at an image acquisition step 420. The number can be automatically changed to a larger or smaller level in order to increase the amount of total accumulated exposure and to improve the signal-to-noise ratio (SNR) of detection and decision. Each image is stored in the memory of the imaging device for further digital image processing.

After acquiring the sequence of images, the software causes processor 106 in the imaging device to analyze the images in order to detect patterns of bursts that are indicative of substantial gamma ray incidence. For this purpose, processor 106 may run a correlation algorithm over the individual images in order to register the images in the same frame of reference and in improve the SNR, at a correlation step 430. Additionally or alternatively, processor 106 may use readings provided by an inertial sensor ("gyro") in device 101 to cancel out movements that occurred during step 420 and thus improve the registration of the images, at an image registration step 440. This sort of registration is useful in distinguishing the radiation emitted by the scintillator from noise and other external factors.

Processor 106 then filters the sequence of images, to differentiate between gamma bursts and artifacts, at a filtering step 450. After discarding non-burst images, the processor may take an average (possibly a weighted average) of the image signal over the whole sequence. Based on the results of step 450, processor 106 assesses the signal level and compares it to the ambient background, at an activity measurement step 460. The processor assesses the signal level to determine whether sufficient visible photons in the appropriate image pattern have been collected to detect a gamma ray event. The above-mentioned provisional patent application gives an estimate of the signal levels that can be expected under typical operating conditions.

If significant gamma ray activity is detected, processor 106 typically reports the measurement results to the user and may sound an alarm if appropriate. For example, the processor may compare the results to two different thresholds, T1 and T2 (T2>T1), at a threshold testing step 470. T1 may be chosen to correspond to a radiation level that is abnormal but not dangerous, while T2 corresponds to a danger level, at which the radiation is hazardous to health. If the measured radiation level is above T1, processor 106 may issue a visual warning to the user, for example, and may issue an alarm when the level exceeds T2. Optionally, the radiation measurements may be superimposed on visible images captured by device 101 in order to show the user the likely source of the radiation.

FIG. 5 is a schematic frontal view of a radiation sensing assembly 540, in accordance with another embodiment of the present invention. In this embodiment, a scintillator material 530 is assembled in an adjustable or movable holder 520, so that by turning around a hinge, for example, the scintillator moves to cover an aperture 510 of the image sensor aperture, as indicated by an arrow 550. This movement can be performed manually by the user, or electronically and automatically in response to a control command from the radiation measurement software running on the imaging device. Once the acquisition sequence has finished, the scintillator/cover is moved away from aperture 510, and the camera regains its ordinary imaging function.

As another alternative (not shown in the figures), a suitable transparent scintillator material, such as NaI(Tl), may be mounted in front of aperture 510 or elsewhere in the optical path of the imaging device. The scintillator in this embodiment may be formed as a window, with thickness typically in the range of 1-3 mm. The scintillator window may built into the imaging device, or it may be added on in the form of a cover. Because it is transparent, it does not interfere with normal, visible imaging operation. An opaque cover (or even the user's finger) may be placed over aperture 510 during radiation measurement.

FIG. 6 is a schematic side view of a radiation sensing assembly 600, in accordance with an alternative embodiment of the present invention. In contrast to the preceding embodiments, this sort of assembly is typically embedded within the imaging device by the manufacturer. In this embodiment, a radiation converter in the form of an electron emitter layer 630 is placed below a camera module 610 in the imaging device, typically behind an image sensor 620 in the module. The electron emitter may be a Europium-rich compound or other rare-earth compounds, possessing the property of strong electron emission in response to gamma or X-ray exposure.

Gamma particles that impinge on the imaging device generally pass without significant attenuation through the plastic housing of module 610 and through image sensor 620 itself, and strike electron emitter layer 630. In response to each incident gamma particle, the electron emitter emits thousands of electrons 650. Many of these electrons strike image sensor 620 and create charge in a manner similar to the effect of strong light incident on the sensor. An image processing algorithm can be used in the manner described above to detect radiation levels and alert the user as required.

Assembly 600 can be used autonomously without user intervention. On this basis, cellular operators or government agencies may be able to remotely read the radioactivity level in the vicinity of each mobile phone equipped with this sort of assembly. If radiation-detecting telephones of this sort are widely deployed, users of these telephones can provide thousands or millions of moving sensors at known locations over an entire region, without necessarily requiring any sort of action by the users. Furthermore, a combination of radioactive readings with ordinary photonic imaging can be used to identify sources and locations of radioactive pollutants on a large scale.

FIG. 7 is a schematic pictorial illustration of a radiation sensing assembly 700, in accordance with a further embodiment of the present invention. In this embodiment, a scintillator 704 is embedded in a cover 702 of an imaging device, such as a cellular telephone. The scintillator is formed as a thin slab, with a shape that is designed to guide light that is emitted in the scintillator to an aperture 708 of the imaging device. A reflective coating 706 on the outside of the scintillator slab prevents the emitted light from escaping.

Although the embodiments described herein relate specifically to detection of radioactivity in the user's ambient surroundings, the principles of the present invention may similarly be applied in other radiation detection applications. Furthermore, the types of devices and algorithms described hereinabove may be applied not only to mobile telephone cameras, but also to other sorts of portable cameras and other imaging devices.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for detecting ionizing radiation, comprising:
   a mount for moveable attachment to a mobile device including a camera;
   a scintillator in the mount, which emits visible light in response to detection of ionizing radiation; and
   optics, coupled to the mount, configured to direct the visible light emitted by the scintillator onto the camera, of the mobile device, when the mount is attached to the mobile device,
   wherein the mount is configured for attachment to a mobile telephone and the optics are configured to direct the visible light emitted by the scintillator onto a camera of the mobile telephone.

2. The apparatus according to claim 1, wherein the mount comprises a cover, which is configured to fit over the mobile device and in which the scintillator is embedded.

3. The apparatus according to claim 2, wherein the scintillator comprises a fiber, having an end positioned so as to direct the light emitted within the fiber toward the camera.

4. The apparatus according to claim 2, wherein the scintillator comprises a slab of a scintillator material.

5. The apparatus according to claim 2, wherein the cover is configured to fit over the camera.

6. The apparatus according to claim 5, wherein the cover is movable between a radiation-sensing position, in which the scintillator blocks the camera, and an image-sensing position, in which the camera is unblocked.

7. The apparatus according to claim 1, and comprising a non transitory computer readable medium carrying software, which when executed by a processor contained in the mobile device, causes the processor to process signals emitted by the camera in order to assess an intensity of the ionizing radiation.

8. The apparatus according to claim 7, wherein the software is configured to evaluate a shape of an image captured by the camera in order to distinguish the light emitted by the scintillator from background light that is incident on the image sensor.

9. The apparatus according to claim 1, wherein the mount is configured to be mounted externally on the mobile device.

10. Apparatus for detecting ionizing radiation, comprising:
    a mobile telephone, comprising an imaging assembly, which comprises a solid-state image sensor camera, for visible imaging by a user;
    a radiation converter mounted in proximity to the image sensor and configured to emit, in response to the ionizing radiation, lower-energy radiation for detection by the image sensor, such that the image sensor is configured to perform both imaging of ionizing radiation for the radiation conversion and the visible imaging by the user; and
    a processor, contained in the mobile telephone, which is configured to process images captured by the image sensor so as to assess an intensity of the ionizing radiation.

11. The apparatus according to claim 10, wherein the radiation converter comprises an electron emitter layer placed behind the solid-state image sensor in the imaging assembly.

12. The apparatus according to claim 10, wherein the radiation converter comprises a scintillator.

13. The apparatus according to claim 10, wherein the processor is configured to evaluate temporal characteristics of a sequence of images captured by the camera in order to distinguish the light emitted by the scintillator from background light that is incident on the image sensor.

14. The apparatus according to claim 10, wherein the processor is configured to evaluate a shape of an image captured by the camera in order to distinguish the light emitted by the scintillator from background light that is incident on the image sensor.

15. The apparatus according to claim 10, wherein the image sensor is operable in a first mode in which its parameters are controlled by a software of the processor which also assess the intensity of the ionizing radiation, and a second mode in which the parameters of the image sensor are controlled by standard automatic control.

16. The apparatus according to claim 10, wherein the image sensor has auto-focus or zoom capabilities.

17. A method for detecting ionizing radiation, comprising:
    coupling a radiation converter to a mobile device comprising an image sensor camera for visible imaging by a user, so as to direct lower-energy radiation onto the image sensor of the mobile device in response to the ionizing radiation, such that the image sensor is configured to perform both imaging of ionizing radiation for radiation conversion and the visible imaging by the user; and
    processing signals emitted by the image sensor, by the mobile device in order to assess an intensity of the ionizing radiation.

18. The method according to claim 17, wherein the radiation converter comprises a scintillator.

19. The method according to claim 18, wherein coupling the radiation converter comprises fitting a cover in which the scintillator is embedded over the mobile device.

20. The method according to claim 18, wherein processing the signals comprises evaluating a shape of an image captured by the image sensor in order to distinguish light emitted by the scintillator from background light that is incident on the image sensor.

21. The method according to claim 17, wherein the radiation converter comprises an electron emitter.

22. The method according to claim 17, wherein the mobile device comprises an inertial sensor and wherein processing the signals emitted by the image sensor comprises cancelling for movements of the mobile device.

23. The method according to claim 17, wherein the image sensor is operable in a first mode in which its parameters are controlled by a software of a processor of the mobile device which also assess the intensity of the ionizing radiation, and in a second mode in which the parameters of the image sensor are controlled by standard automatic control.

24. The method according to claim 17, wherein the image sensor has auto-focus or zoom capabilities.

25. The method according to claim 17, wherein coupling the radiation converter to the mobile device comprises mounting the radiation converter externally on the mobile device.

* * * * *